United States Patent [19]

Sugimori et al.

[11] Patent Number: 4,734,238

[45] Date of Patent: Mar. 29, 1988

[54] PROCESS FOR PRODUCING POWDER OF CATIONIC POLYMER

[75] Inventors: Teruhiko Sugimori; Hideaki Habara; Ken-ichi Inukai, all of Ohtake; Akihisa Furuno, Yokohama, all of Japan

[73] Assignees: Mitsubishi Rayon Co., Ltd.; Nitto Chemical Indutry Co., Ltd.; Diafloc Co., Ltd., all of Tokyo, Japan

[21] Appl. No.: 841,840

[22] Filed: Mar. 20, 1986

[30] Foreign Application Priority Data

Mar. 20, 1985 [JP] Japan .................................. 60-54239

[51] Int. Cl.⁴ .......................... B29B 9/04; C08F 2/10
[52] U.S. Cl. .............................. 264/144; 264/331.18; 526/62; 526/211
[58] Field of Search ........................... 264/244, 331.18; 526/62, 211

[56] References Cited

U.S. PATENT DOCUMENTS

| | | | |
|---|---|---|---|
| 2,287,087 | 6/1942 | Clausen et al. | 264/144 |
| 3,491,177 | 1/1970 | Johnson | 264/144 X |
| 4,129,489 | 12/1978 | Christenson et al. | 264/144 X |
| 4,178,221 | 12/1979 | Boutin et al. | 526/65 X |
| 4,190,717 | 2/1980 | Suzuki et al. | 526/62 |
| 4,283,517 | 8/1981 | Perricone et al. | 526/62 X |

FOREIGN PATENT DOCUMENTS 50-80378  6/1975 Japan .
51-133388 11/1976 Japan .
52-126494 10/1977 Japan .

Primary Examiner—Philip Anderson
Attorney, Agent, or Firm—Oblon, Fisher, Spivak, McClelland & Maier

[57] ABSTRACT

The invention relates to a process for producing a powder of a cationic polymer by spreading on a moveable carrier a layer of an aqueous solution of a vinyl monomer, carrying out continuous polymerization followed by peeling off hydrous polymer from the carrier in a hot state, and cutting said hydrous polymer in a hot state by a shearing stress.

9 Claims, 3 Drawing Figures

PROCESS FOR PRODUCING POWDER OF CATIONIC POLYMER

BACKGROUND OF THE INVENTION

Cationic polymers have been utilized widely as aids for paper making or agglomerating agents for treatment of water and especially as dehydrating aids for sewage sludge. The cationic polymer obtained from a monomer selected from the group consisting of a compound represented by Formula (I):

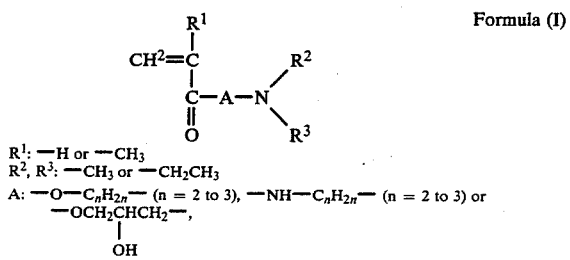

$R^1$: —H or —$CH_3$
$R^2$, $R^3$: —$CH_3$ or —$CH_2CH_3$
A: —O—$C_nH_{2n}$— (n = 2 to 3), —NH—$C_nH_{2n}$— (n = 2 to 3) or
—$OCH_2CHCH_2$—,
         |
         OH a salt thereof and a derivative thereof quaternized with an alkylating agent; or the copolymer of said monomer with other water-soluble monomers such as acrylamide can give easily a polymer of high molecular weight, is suited for the above uses, thus being one of the typical cationic polymers industrially produced. Also, while the cationic polymer is used as an aqueous solution, it is generally traded in these days primarily as powder due to economy in transportation cost and easiness in handling (metering and dissolution).

As a process for producing a cationic vinyl polymer, an aqueous solution polymerization process is generally employed for the reason of its economy and easiness in obtaining a high molecular weight polymer. In this process, from the aspects of improvement of productivity and drying cost, the polymerization in higher monomer concentration has been investigated.

Typical examples of this process are disclosed in Japanese Laid-open patent Publication Nos. 80378/1975 and 133388/1976.

In these publications, polymerization is carried out in a highly concentrated aqueous solution with 80% or higher of a monomer comprising mainly the monomer of Formula [I] in a polymerization vessel, and the glassy solid obtained after cooling is crushed thereby to obtain efficiently a powdery cationic polymer. However, in practicing this process industrially, there is involved a serious problem in post-treatment of the polymer.

That is, when polymerization is carried out in a mass, the block produced will have a weight of at least 100 kg on an industrial scale, and it will take practically a whole 24 hours to cool this product to a crushable temperature. For this reason, a large space is required in production installation, and further the energy cost is greatly influenced by use of the cooling energy such as cold wind.

The present inventors have made investigations on the process for carrying out continuous polymerization on a movable carrier in order to further rationalize the aqueous solution polymerization of the monomer comprising mainly the monomer of Formula (I). In polymerization on a movable carrier, cooling can be performed more efficiently as compared with the polymer in shape of a mass, because a polymer shaped into a plate can be obtained. On the other hand, if the plate can be comminuted under a hot state, the time requiring cooling step can be substantially shortened to make the steps further simplified.

However, the plate-shaped polymer peeled off under a hot state from the movable carrier is a tough solid having slight softness, and it is almost impossible to crush it by an impact force and it cannot be thrown directly into a conventional crushing machine rotating at high speed on account of its shape.

Accordingly, the present inventors have investigated intensively on a process which can simplify the cooling step by comminuting the plate-shaped polymer under a hot state, and accomplished the present invention.

SUMMARY OF THE INVENTION

The present invention provides a process for producing powder of a cationic polymer by spreading in a layer on a movable carrier an aqueous solution containing a vinyl monomer comprising mainly at least one monomer selected from the group consisting of a compound represented by Formula (I):

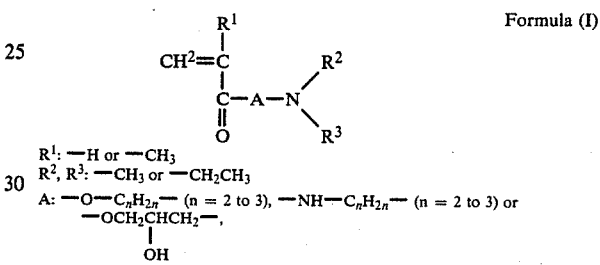

$R^1$: —H or —$CH_3$
$R^2$, $R^3$: —$CH_3$ or —$CH_2CH_3$
A: —O—$C_nH_{2n}$— (n = 2 to 3), —NH—$C_nH_{2n}$— (n = 2 to 3) or
—$OCH_2CHCH_2$—,
         |
         OH a salt thereof and a derivative thereof quaternized with an alkylating agent (hereinafter referred to as the monomer having the structure shown by Formula (I)), in an amount of 75 to 90% by weight to carry out continuous polymerization, which comprises:

(a) carrying out polymerization of said aqueous solution, with being made a layer with a thickness of 40 mm or less, and after substantial completion of polymerization, peeling off the resulting hydrous polymer from the carrier under such a hot state that the central portion of the hydrous polymer is at a temperature not lower than the Vicat softening point of said hydrous polymer (hereinafter referred to as the hot state), (b) cutting said polymer under the hot state by a shearing stress into rods or dice, followed further by crushing if necessary, into sizes of 20 mm or less.

DETAILED DESCRIPTION OF THE INVENTION

Figure 1:
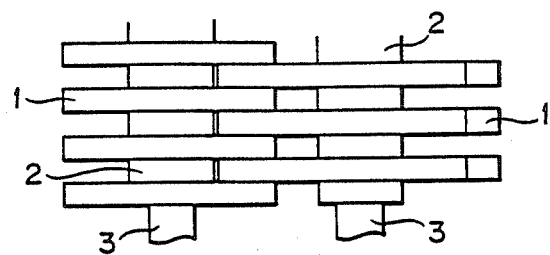
FIG. 1 is a schematic view of the rotatory blades portion provided on the polymer cutting device used in Examples.

The monomer composition to be used in the present invention is a composition containing 50 mol % or more of the monomer represented by the above Formula (I). The monomer of Formula (I) can be dissolved in water in the free form or in the form of a salt and provided for polymerization. The monomer of Formula (I) may include dialkylaminoalkyl (meth)acrylate, dialkylaminoalkyl (meth)acrylamide and 1-(meth)acrylyroy12-hydroxy-3-dialkylaminopropane. For preparation of the aqueous monomer solution provided for polymerization, a salt of the monomer of Formula (I) is generally used. Its salt is not particularly limited, but there may be included, for example, mineral acid salts such as with hydrochloric acid, sulfuric acid and the like. It is also possible to use the compound of Formula (I) of which nitrogen atom is quaternized with an alkylating agent such as methyl chloride, dimethyl sulfate, benzyl chloride and the like.

The monomer composition to be provided for polymerization may be a single monomer of Formula (I) or a mixed system thereof, or alternatively a mixture of said monomer with other copolymerizable monomers. The monomers copolymerizable with the monomer of Formula (I) may include various water soluble vinyl monomers. Typical examples may include acrylamide, methacrylamide and N-substituted derivatives of these. It is also possible to use acrylonitrile or an acrylate in an amount within the range capable of forming a homogeneous aqueous solution with the monomer of Formula (I).

The monomer concentration during polymerization is economically more advantageous as it is higher, but it must be within the range capable of forming of a homogeneous solution and hence the upper limit is about 90% by weight in view of the solubility of the monomer. On the other hand, while cutting with shearing stress becomes increasingly easier as the concentration is lowered, crushing for obtaining powdery polymer becomes difficult. For this reason, the monomer concentration during polymerization is required to be 75 to 90%. The aqueous monomer solution is spread in a layer on a movable carrier to carry out polymerization continuously. In this case, the thickness of the monomer layer during polymerization is desired to be thicker from the standpoint of productivity, but elevation of the inner temperature of the polymer becomes greater as the thickenss is increased, whereby no polymer having high molecular weight as the product property can be obtained. Also, since the force required for cutting becomes markedly greater, preparation of the cutting device required therefore can be done with difficulty. For these reasons, the thickness is restricted to 40 mm or less. Further, since productivity of the polymer is lowered when the monomer layer is thin, it is preferable to make the thickness 5 mm or more.

Polymerization reaction on a movable carrier can be carried out by use of a polymerization initiator which is soluble in the system selected from among conventional polymerization initiators such as peroxides, azo compounds or combinations of peroxides and reducing agents, in a nitrogen atomosphere or by sandwiching between two belts. Also, the photoirradiation polymerization process on a carrier as disclosed in Japanese Laid-open patent publication No. 126494/1977 can be particularly suitably combined with the post-treatment method of the present invention, as its reaction condition can be well controlled.

After completion of polymerization, the hydrous polymer under the hot state is peeled off from the movable carrier. Here, it is meant by "under the hot state" that the central portion of the hydrous polymer is under the state of a temperature of the Vicat softening point or higher of said polymer. In the present invention, the Vicat softening point of the polymer refers to the temperature obtained by measuring the hydrous polymer obtained by the process of the present invention according to JIS K7206 (Vicat softening point testing method of thermoplastic plastics). The hydrous polymer comprising mainly the monomer of Formula (I) and containing 10 to 25% weight of water has a Vicat softening point generally of 40° to 80° C., although it may differ slightly depending on the monomer composition and the water content.

The temperature at the central portion of the hydrous polymer can be measured, while practicing polymerization and cooling, by means of a thermocouple type temperature detection end inserted into the aqueous monomer solution at the stage before the initiation of polymerization. The thermocouple type temperature detection end may be withdrawn before cutting, and when it is inconvenient to carry out such an measurment in practicing the present invention on an industrial scale, the temperature at the central portion of the hydrous polymer can be measured by using a batch system model experimental device or an experimental device on a miniature scale in conformity with the polymerization conditions and cooling conditions to be employed, and the time at which the hydrous polymer is peeled off from the carrier and the time for cutting can be adequately selected from the data obtained to provide the temperature conditions as shown in the present invention.

Next, cutting by shearing stress as mentioned in the present invention is not particularly limited. However, the cutting can be carried out, for example, by means of a cutting device comprising a plurality of rotatory disk-like blades made of metal with a thickness of some 10 mm and a diameter of some 100 mm, superposed alternately on two shafts juxtaposed in palallel to each other, at an interval narrower than the diameter of the disk, by rotating the blades on the two shafts in opposite directions slowly and delivering the polymer to be cut to the juxtaposed portion thereof to cut into the thickness of the blade. It is preferred that at least one projection is provided on at least one of the above rotatory disk-like blades. In the above cutting device, the parallel two axes rotate inwardly and the side edges of the opposite two rotatory blades which engage with each other cut the sheet-like product by the shear stress into small peices. The projection or projections of the rotatory blades function to draw the sheet and to cut it transversely into small pieces. By changing the thickness of the rotatory blade and the number of projections, the size of the small peices can be determined. By carrying out once such cutting, the plate-shaped polymer can be cut into rods, which rod-shaped polymer can be further made in shape of dice by cutting again the polymer with the direction being changed. In this specification, "dice" includes square or rectangular chips.

As the cutting device, it is of course possible to utilize various other devices such as guillotine type device.

If the size of the polymer is larger than 10 mm, even after cutting into dice, the rod-shaped or dice-shaped polymer is further fed directly into a crushing machine such as a cutter mill and crushed therein. During this operation, it can be crushed into sizes of about several mm whether the temperature of the polymer may be higher or lower than the so called softening point. A rational industrial device can be provided by using in combination these cutting device and a crusher as upper and lower devices. It is required for carrying out drying and/or crushing efficiently in the post-steps that the diameter of the particles after cutting into dice or after crushing should be 20 mm or less, preferably 10 mm or less.

The crushed particles can be further crushed into sizes of 1 mm or less to give a product as such, when the water content during polymerization is small, for example, 15% or lower. However, generally speaking, slight drying is required for preventing from caking of the product powder, and it may be considered to use the method in which the coarse particles are crushed after drying or the method in which drying is effected after crushing. Although the load applied on crushing is smaller in the former method, the cost required for drying is smaller in the latter method, and therefore the latter method is generally more economical as the whole. Anyway, the process after crushing may be adequately selected depending on other circumstantial situation such as water content and particle size required for the product.

EXAMPLE

The present invention is described by referring to the following Examples, by which the present invention is not limited at all.

Example 1

Into a 80% aqueous solution of dimethylaminoethyl methacrylate quaternized with methyl chloride, 200 ppm of benzoin ethyl ether was added and, after adjustment of pH to 3.5, the oxygen in the monomer was removed. The above monomer solution was fed continuously into a belt polymerizing device, comprising a box made of rubber weirs of 3 cm square adhered onto both sides along the direction of the progress of a belt conveyer made of stainless steel with a width of 30 cm and a glass covered thereover, which is internally made under a nitrogen atomosphere, and UV-ray was irradiated from above the glass to carry out polymerization of the above monomer solution.

Figure 3:
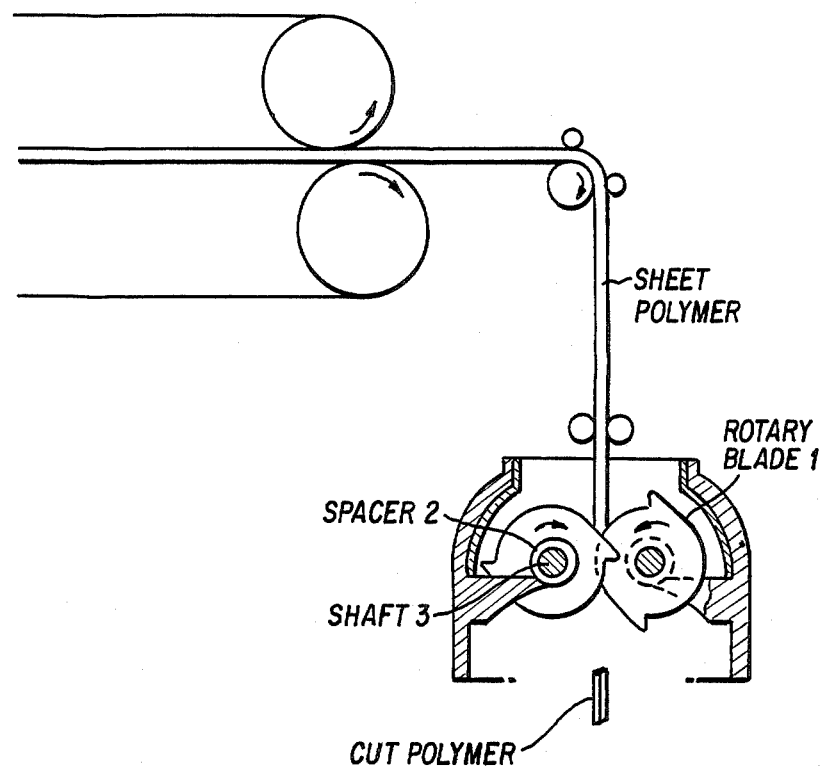
FIG. 3 is a schematic view of the apparatus for carrying out the process of the Examples.

On the other hand, a device having rotatory blades 1 made of metal with a blade thickness of 3 cm and a diameter of 30 cm superposed alternately through spacers 2 on the two shafts 3 juxtaposed in parallel to each other as shown in FIG. 3 was prepared, and while the rotatory blades were rotated slowly inwardly, as shown by arrow marks in FIG. 3, and the polymer in shape of a plate with a thickness of about 3 cm and an average inner temperature of 90° C. discharged from the belt conveyer was fed to the juxtaposed portion thereof. The polymer in shape of a plate when peeled off from the belt conveyer had a Vicat softning point of 52° C. and its temperature at the central portion was 95° C.

Figure 2:
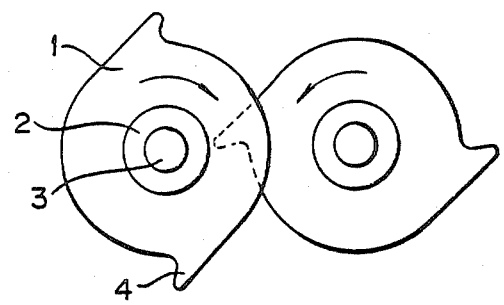
FIG. 2 is a schematic view in order to show the driving conditions of the rotatory blades provided on the device shown in FIG. 1.

The polymer was cut into rods of 3 cm square and at the same time further into length of about 45 cm by approach of the projection 4 provided on at least one of the blades, as shown in FIG. 2, to the spacer.

By providing a crushing machine such as a cutter mill having a fixed blade and a blade rotating at high speed directly below the cutting machine shown in FIG. 1, the polymer cut in 3 cm×3 cm×45 cm as described above was immediately crushed into particles with an average size of about 5 mm.

The crushed product was dried in a hot air of 80° C. for 1 hour and further pulverized into sizes of 1 mm or less to provide a product.

EXAMPLES 2, 3, 4 AND 5

The polymer shaped in a plate polymerized in the same manner as in Example 1 was fed into the cutting machine and the crushing machine in the same manner as in Example 1 under the following temperature conditions.

|  | Average inner temeprature °C. | Temperature at the central portion |
|---|---|---|
| Example 2 | 80 | 84 |
| Example 3 | 70 | 74 |
| Example 4 | 60 | 63 |
| Example 5 | 50 | 52 |

Under each temperature condition, treatment under the hot state could be carried out in the same manner as in Example 1.

COMPARATIVE EXAMPLE 1

An aqueous 80% solution of dimethylamino ethylmethacrylate was adjusted to pH 3.5, adjusted to 30° C. after gas contained in the solution is replaced with $N_2$, and charged into a bucket of 30 liter made of SUS and coated with Teflon, followed by addition of a redox initiator and an azo initiator, and polymerization was carried out under $N_2$ atomosphere. The polymer obtained was taken out as the mass from the bucket. The polymer in shape of a mass was left to cool in the air at 25° C. for a certain period of time and then thrown into a cutter mill of 22 KW. The cooling time and the temperature at the polymer center are shown together with crushed state in Table 1.

TABLE 1

| Cooling time (hrs.) | Temeprature of center portion of polymer (°C.) | Crushed state |
|---|---|---|
| 0 | 110 | Uncrushable |
| 3 | 79 | Uncrushable |
| 6 | 65 | Uncrushable |
| 9 | 54 | Uncrushable |
| 12 | 45 | Crushable |
| 15 | 37 | Crushable |

As shown in Table 1, the polymer polymerized in a mass is uncrushable at a temperature higher than the Vicat softening point of the polymer and a long time is required for cooling, and therefore a cooling place with a broad area is required in practicing on an industrial scale.

EXAMPLE 6

To a homogeneous solution made by mixing 42 kg of a 80% aqueous solution of dimethylaminoethyl methacrylate quaternarized with methyl chloride, 24.1 kg of a 70% aqueous solution of dimethylaminoethyl methacrylate neutralized with sulfuric acid and 33.7 kg of acrylamide, 100 ppm of benzoin methyl ether was added and the resulting mixture was adjusted to pH 5.0, gas contained in the solution being replaced with $N_2$, and thereafter polymerized by means of the belt polymerizing device of Example 1. The polymer after polymerization was found to have a Vicat softening point of 52° C., and at an average inner temperature of 80° C. and a temperature at the central portion of 88° C., the polymer was cut into 20 mm square by means of a guillotine type cutter, followed by crushing by a cutter mill to a size of 5 mm. Also for the polymer with this composition, sheet polymerization and cutting by shear stress under the hot state were possible.

As compared with the polymerization in a tank of the prior art where a time of day unit was required for cooling of the polymer to a crushable temperature, according to the present invention the product can be obtained by a post treatment within hour unit after polymerization, because the polymer is crushed under the hot state. Also, since the polymer under the hot state is peeled off from the carrier and provided as such to the crushing step in the present invention, the space in manufacturing equipment such as transportation and cooling can be reduced to a great extent as compared with the case of the prior art in which the polymer is cooled after peeling off from the carrier. Moreover, since there is no need to use cold air for cooling, the energy cost and therefore the product cost can be markedly reduced. In addition, as compared with the case of the prior art wherein the polymer is cooled on a carrier, there is no need to cool the polymer in the present invention and therefore the length of the carrier which is expensive in production can be shortened.

We claim:

1. A process for producing powder of a cationic polymer by spreading in a layer on a movable carrier an aqueous solution containing a vinyl monomer comprising mainly at least one monomer selected from the group consisting of a compound represented by Formula (I):

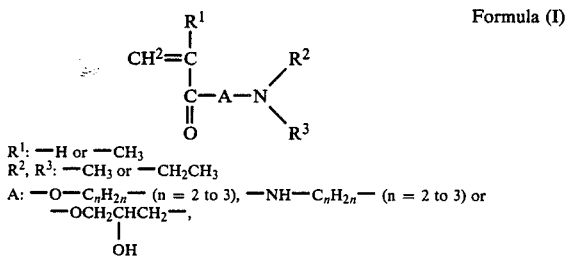

Formula (I)

$R^1$: —H or —CH$_3$
$R^2$, $R^3$: —CH$_3$ or —CH$_2$CH$_3$
A: —O—C$_n$H$_{2n}$— (n = 2 to 3), —NH—C$_n$H$_{2n}$— (n = 2 to 3) or —OCH$_2$CHCH$_2$—,
                                                                                |
                                                                               OH a salt thereof and a derivative thereof quaternized with an alkylating agent in an amount of 75 to 90% by weight, and carrying out continuous polymerization, which comprises:

(a) carrying out polymerization of said aqueous solution, with being made a layer with a thickness of 40 mm or less, and after substantial completion of polymerization, peeling off the resulting hydrous polymer from the carrier under such a hot state that the central portion of the hydrous polymer is at a temperature not lower than the Vicat softening point of said hydrous polymer, and (b) cutting said polymer under the hot state that the central portion of the hydrous polymer is at a temperature not lower than the Vicat softening point of said hydrous polymer by a shearing stress into rods or dice, followed further by crushing, if necessary, into sizes of 20 mm or less.

2. The process for producing powder of a cationic polymer according to claim 1, wherein said vinyl monomer contains said at least one monomer selected from the group consisting of the compound represented by Formula (I), a salt thereof and a derivative thereof quaternized with an alkylating agent in an amount of 50% by weight or more.

3. The process for producing powder of a cationic polymer according to claim 1, wherein said salt of the compound represented by Formula (I) is a salt with one selected from the group consisting of hydrochloric acid and sulfuric acid.

4. The process for producing powder of a cationic polymer according to claim 1, wherein said alkylating agent is one selected from the group consisting of methyl chloride, dimethyl sulfate and benzyl chloride.

5. The process for producing powder of a cationic polymer according to claim 1, wherein said derivative of the compound represented by the formula (I) quaternarized with an alkylating agent is dimethylaminoethyl methacrylate quaternized with methyl chloride.

6. The process for producing powder of a cationic polymer according to claim 1, wherein the aqueous monomer solution spread on the carrier has a thickness of 5 mm or more.

7. The process for producing powder of a cationic polymer according to claim 1, wherein cutting of the polymer by shearing stress is carried out by means of a cutting device comprising a plurality of rotatory disklike blades made of metal on two shafts juxtaposed in parallel to each other at an interval narrower than the diameter of the disks, by rotating the blades on the two shafts in opposite directoins slowly and delivering the polymer to the juxtaposed portion of the blades thereby to cut the polymer in thickness of the blade.

8. The process for producing powder of a cationic polymer according to claim 7, wherein at least one projection is provided on at least one of said blades.

9. The process for producing powder of a cationic polymer according to claim 7, wherein said cutting device and a crusher are provided as upper and lower devices in combination with each other.

* * * * *